United States Patent
Styron (10) Patent No.: US 7,376,231 B2
(45) Date of Patent: May 20, 2008

(54) ABUSE RESISTANT SAFETY TELEPHONE AND METHOD OF ADAPTATION

(76) Inventor: Mark Styron, 3118 Lausanne, Pasadena, TX (US) 77505

( * ) Notice: Subject to any disclaimer, the term of this patent is extended or adjusted under 35 U.S.C. 154(b) by 893 days.

(21) Appl. No.: 10/745,868

(22) Filed: Dec. 24, 2003

(65) Prior Publication Data
US 2004/0136525 A1 Jul. 15, 2004

Related U.S. Application Data

(63) Continuation-in-part of application No. 10/352,611, filed on Jan. 28, 2003, now abandoned, which is a continuation-in-part of application No. 09/709,753, filed on Nov. 11, 2000, now Pat. No. 6,512,828, which is a continuation of application No. 09/459,314, filed on Dec. 10, 1999, now abandoned, which is a continuation-in-part of application No. 09/017,982, filed on Feb. 3, 1998, now Pat. No. 6,009,169.

(51) Int. Cl.
*H04M 1/00* (2006.01)
*H04M 9/00* (2006.01)

(52) U.S. Cl. .................................... 379/441; 379/453
(58) Field of Classification Search ................ 379/422, 379/433.07, 434, 453, 441, 420.02, 451
See application file for complete search history.

(56) References Cited

U.S. PATENT DOCUMENTS

| | | | |
|---|---|---|---|
| 2,277,907 A | 3/1942 | Goodale, Jr. | |
| 3,144,513 A | 8/1964 | Sherron | |
| 4,101,735 A | 7/1978 | Bridenbaugh | |
| 4,104,485 A | 8/1978 | Pessel | |
| 5,371,790 A | 12/1994 | Nevo | |
| 6,009,169 A * | 12/1999 | Styron | 379/453 |
| 6,512,828 B1 * | 1/2003 | Styron | 379/453 |
| 2003/0112968 A1 * | 6/2003 | Styron | 379/441 |

* cited by examiner

*Primary Examiner*—Curtis Kuntz
*Assistant Examiner*—Phylesha L Dabney
(74) *Attorney, Agent, or Firm*—Buche & Associates, P.C.; John Karl Buche (57) ABSTRACT

A safety pay telephone using conventional telephone mechanical and electrical components mounted within a telephone housing, typically mounted on a wall, with the earpiece and mouthpiece mounted within the telephone. To operate, the user deposits the proper amount of currency and pushes an on/off switch, dials his number, and then places his ear next to the fixed earpiece. A method of retrofitting a conventional telephone with a retrofit housing member that permits that existing handset to be protected within a retrofit housing member. The safety phone is designed for use in prisons so inmates within a prison cannot hang themselves with a handset cord or break a handset and handset cord off for use as a weapon. The safety telephone is also designed for use in environments wherein the telephone is subject to abuse. The safety telephone design reduces the cost of maintenance by eliminating the need to fix and replace telephone components.

3 Claims, 7 Drawing Sheets

ABUSE RESISTANT SAFETY TELEPHONE AND METHOD OF ADAPTATION

CROSS-REFERENCE TO RELATED APPLICATIONS

This is a continuation-in-part under 37 CFR 1.53(b) to application Ser. No. 10/352,611, filed on Jan. 28, 2003 now abandoned, which is a continuation-in-part application under 37 CFR 1.53(b) to application Ser. No. 09/709,753, filed on Nov. 11, 2000, now U.S. Pat. No. 6,512,828, issued on Jan. 28, 2003, which is a continuation application under 37 CFR 1.53(b) to application Ser. No. 09/459,314, filed on Dec. 10, 1999, now abandoned, which is a continuation-in-part application under 37 CFR 1.53(b) to application Ser. No. 09/017,982, filed on Feb. 3, 1998, now U.S. Pat. No. 6,009,169.

STATEMENT REGARDING FEDERALLY SPONSORED RESEARCH OR DEVELOPMENT

Not Applicable.

BACKGROUND OF THE INVENTION

1. Field of the Invention

This invention relates generally to telephone equipment and more specifically to a structure and method for retrofit of a pay telephone for use by inmates or in other environments wherein the telephone is subject to abuse (hereinafter referred to as a safety phone).

2. Description of the Related Art

Numerous hands-free telephone equipment systems have been taught in prior art. U.S. Pat. No. 2,277,907, issued to Goodale, Jr. et al., discloses a speaker attachment for a conventional telephone. U.S. Pat. No. 3,144,513, issued to Sherron, teaches a partially enclosed telephone stall with a microphone and speaker mounted in the enclosure wall of the booth. U.S. Pat. No. 4,101,735, issued to Bridenbaugh, uses a shared transducer, alternately functioning as a speaker and a microphone, connected to a conventional telephone. U.S. Pat. No. 4,104,485, issued to Pessel et at, discloses a loudspeaker system mounted over a conventional telephone. U.S. Pat. No. 5,371,790, issued to Nevo et at, discloses a telephone such that a mouthpiece, an earpiece, an electronic circuit board, a push-button dialing pad and a dial tone actuating switch are contained in a single housing and which places the entire phone in a housing similar to a conventional telephone handset. The Nevo '790 patent does not teach safety and vandal resistance elements; in fact, the entire phone or alternatively the exterior connection cable may easily be used as a weapon. None of the prior art utilizes a design for a telephone that can be securely mounted to a wall or other support structure, and is self-contained with minimal external parts, as described herein.

BRIEF SUMMARY OF THE INVENTION

This invention provides, inter alia, a new and improved telephone that:
provides hands-free operation;
is easy to use;
is economical to manufacture;
is resistant to vandalism and is thus low-maintenance;
has no external cord, handset or other external parts that could be used as a weapon or means for vandalism or self-injury;
has an escrow mechanism for accepting payment; and
provides for retrofitting an existing phone with an abuse-resistant configuration.

This invention may be embodied in the form illustrated in the accompanying drawings. The telephone contains conventional telephone mechanical and electrical components, including a push-button dialing pad, earpiece, mouthpiece, electronic circuitry, and switching circuitry. The components are mounted within a telephone housing, typically mounted on a wall, with the earpiece and mouthpiece mounted within the housing to serve as a hands-free telephone for safety. Inmates within a prison can no longer hang themselves with a handset cord or break off the handset and handset cord to use as a weapon. In non-prison use, the phone is more resistant to vandalism or destruction. This phone reduces repairs by eliminating the need to fix and replace the telephone handset, thereby saving money for the cost of maintenance.

The drawings are illustrative only, and changes may be made in the specific construction illustrated and described within the scope of the appended claims. Other objects of the invention will become apparent from time to time throughout the specification hereinafter disclosed.

BRIEF DESCRIPTION OF THE DRAWINGS

Similar reference characters denote corresponding features consistently throughout the attached drawings.

DESCRIPTION OF THE INVENTION

Figure 1:
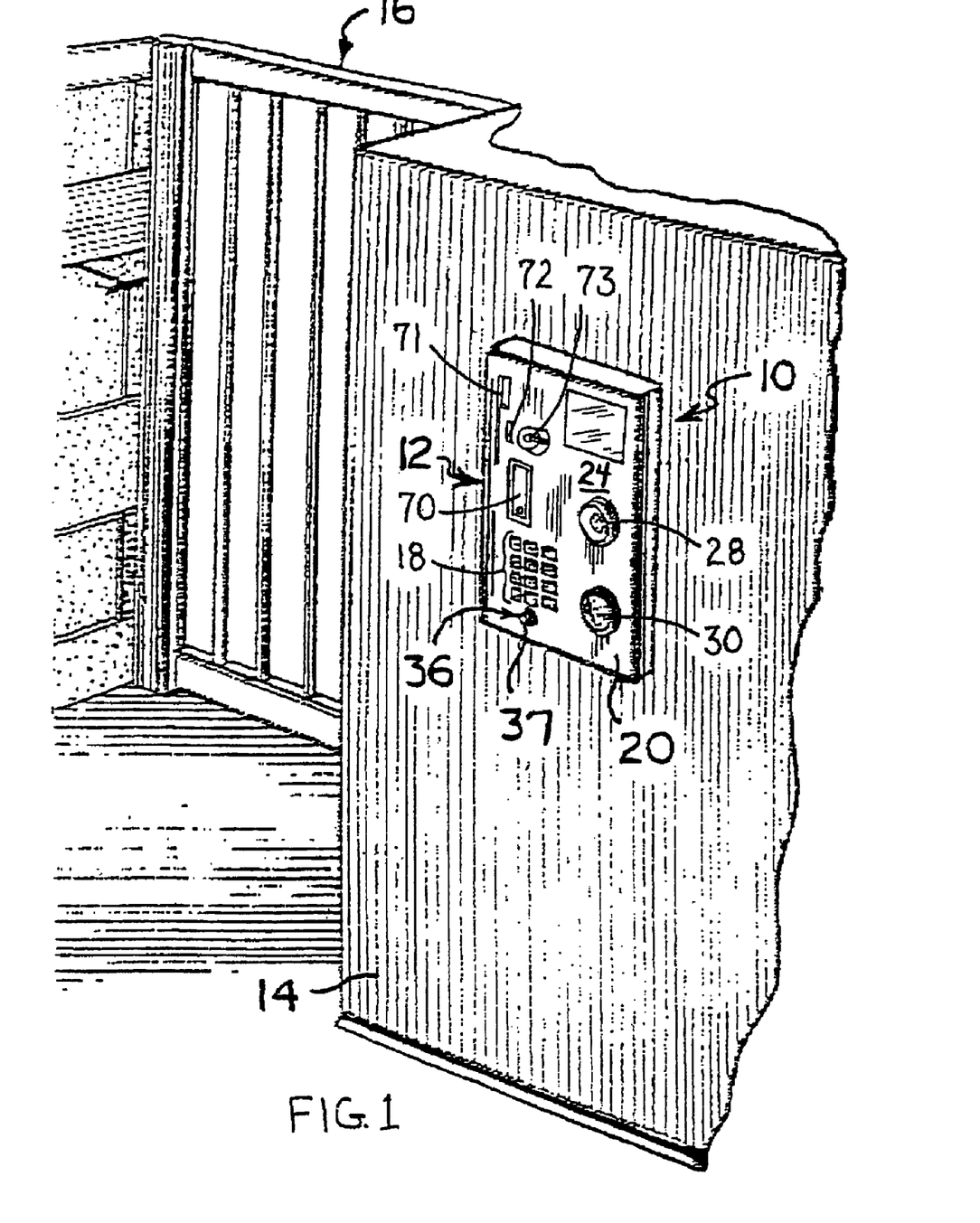
FIG. 1 is a perspective view of an exemplary embodiment of the present invention mounted into a wall.
Figure 2:
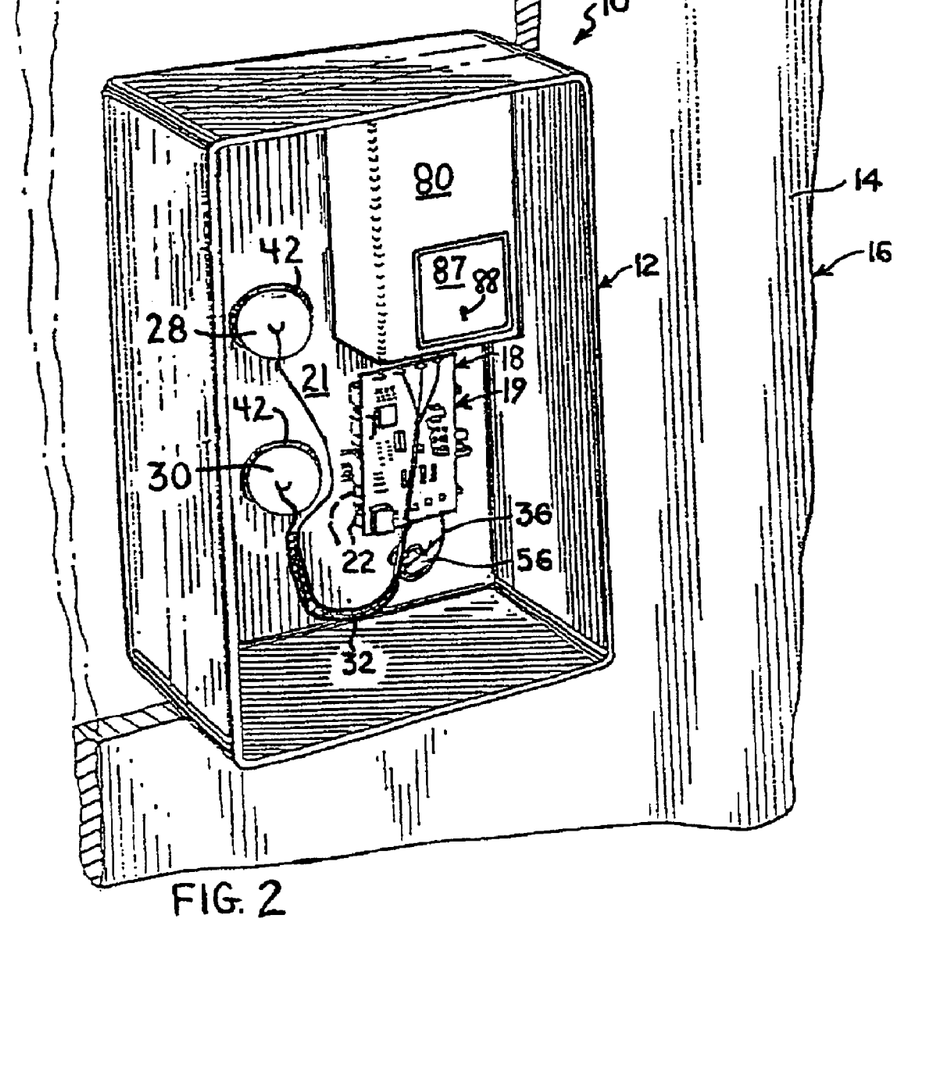
FIG. 2 is a rear perspective view of the embodiment in FIG. 1.
Figure 3:
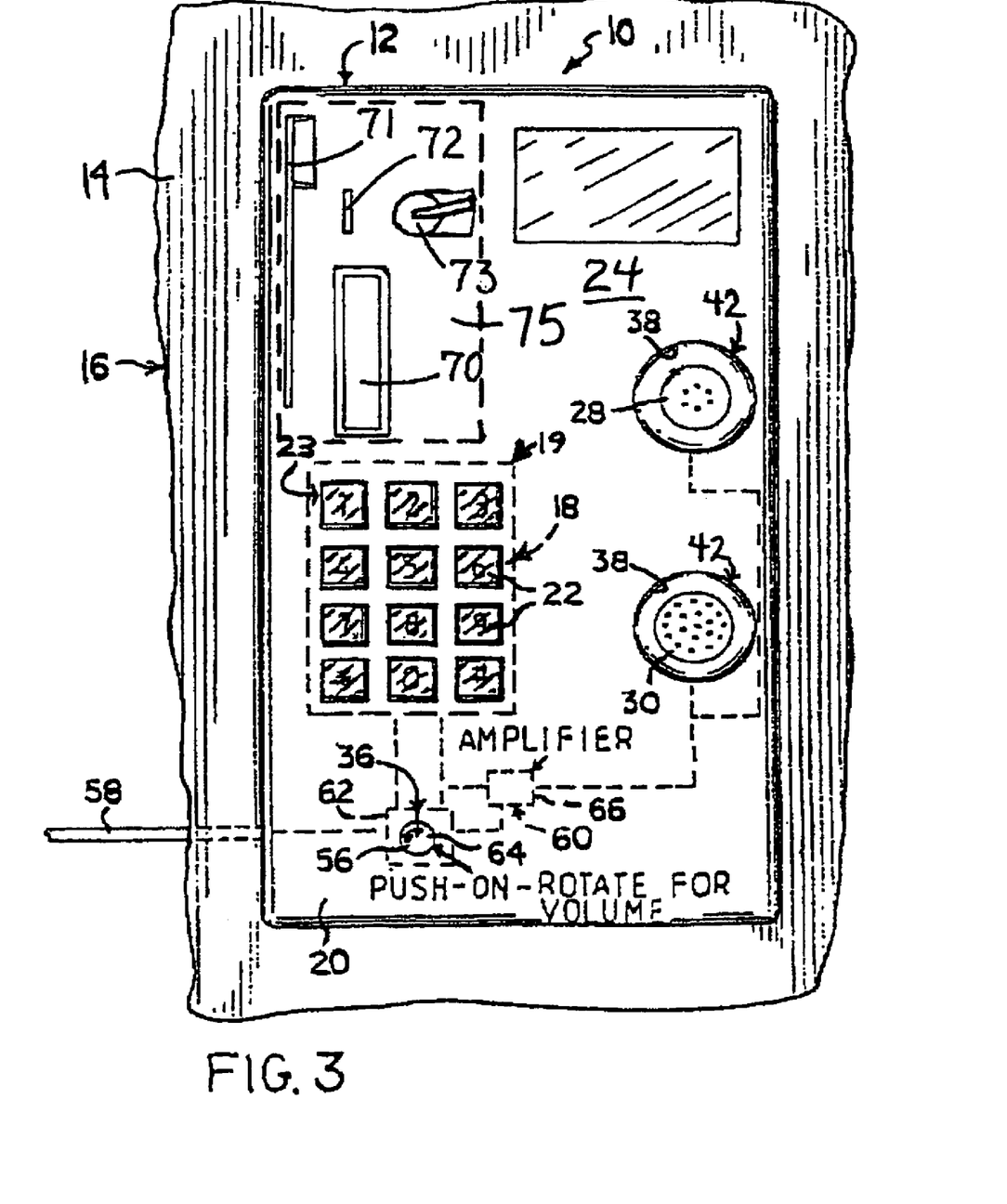
FIG. 3 is a front view of the invention, showing diagrammatically an electrical circuit incorporating a volume control for the earpiece and mouthpiece.

The present invention is a telephone, or just phone, described as telephone 10, generally depicted in FIGS. 1-3, of the type having a durable or hardened housing 12, capable of being mounted to a building wall, such as building wall 14 of prison 16. While telephone 10 is described as being mounted and used in prison 16, it is understood that telephone 10 may be used, mounted or free standing, in any location where a telephone is desired that encompasses the safety and security features described herein. Telephone 10 may be modified for use with coin or card payment mechanisms using standard methods and electrical/mechanical designs for this feature.

Typically, telephone 10 may be recessed into wall 14, so that only a portion of housing 12 is accessible to a user. Alternatively, telephone 10 is mounted to building wall 14 by mechanical and locking attachment of housing 12 to a mounting plate (not shown) that is anchored to building wall 14.

Referring to FIGS. 1 and 2, housing 12 includes a housing front wall 20. Housing front wall 20 includes a front wall inner surface 21 and a front wall outer surface 24 opposite the front wall inner surface 21. Front wall outer surface 24 is generally exposed to a user, while the front wall inner surface 21 is generally interior to the housing 12 and inaccessible to a user. Components affixed to the front wall inner surface 21 are thus protected from abuse by the user. Located within housing 12, and typically attached to front wall inner surface 21, are an electronic circuit board 19, an earpiece 28, and a mouthpiece 30. Earpiece 28 and mouthpiece 30 may be referred to collectively as a handset 26, even if their physical connection is merely proximity.

Referring to FIGS. 1 through 3, typically, a push-button dialing pad 18 is a component of electronic circuit board 19, which is mounted to the front wall inner surface 21. In an alternative embodiment, push-button dialing pad 18 can be separate from electronic circuit board 19 and electrically connected. A plurality of push-button digits 22 of push-button dialing pad 18 extend outward through push-button apertures 23 through housing front wall 20. A plurality of push-button digits 22 extend a sufficient distance to afford full travel distance for each of the push-button digits 22 to effect activation of the electric information switch associated with each push-button digit 22. Alternatively, push-button digits 22 may be substantially flush with or slightly recessed with respect to the front wall outer surface 24, such as to protect the push-button digits 22 from abuse, and the push-button apertures 23 may be sufficiently large to accommodate a user's finger while depressing the push-button digits 22.

Aural output and input to telephone 10 is provided respectively by earpiece 28 and mouthpiece 30, each extending outward from housing front wall 20 through a respective aural aperture 38. In the exemplary embodiment, both the earpiece 28 and the mouthpiece 30 are mounted to the interior of the housing 12 on or near the front wall inner surface 21 of the front wall 20. Earpiece 28 and mouthpiece 30 are each electrically connected to electronic circuit board 19 by connection wire 32. Earpiece 28 and mouthpiece 30 are mounted such that earpiece 28 is positioned above mouthpiece 30. Earpiece 28 and mouthpiece 30 are affixed to housing front wall 20 using any appropriate form of attachment known in the art. This means of attachment may include adhesives, mechanical clamps (not shown) interior to housing 12, or any other means of attachment that provides secure mounting of earpiece 28 and mouthpiece 30 to housing 12, such that they can not be easily removed from the outside of housing 12. In the exemplary embodiment, annular seals 42 seal earpiece 28 and mouthpiece 30 into aural apertures 38. Each annular seal 42 extends about earpiece 28 and mouthpiece 30 within the two vertically spaced apart apertures 38 in the housing front wall 20 of the housing 12.

In an alternative embodiment, earpiece 28 and mouthpiece 30 are mounted within telephone 10, preferably to front wall inner surface 21, such that no portions of earpiece 28 or mouthpiece 30 extend through housing front wall 20. This mounting may thus further protect the earpiece 28 and mouthpiece 30 from abuse. In this embodiment, aural communication to earpiece 28 and mouthpiece 30 is afforded through a sound transparent section of housing front wall 20, such as a plurality of small holes. This sound transparent section provides protection to earpiece 28 and mouthpiece 30, while allowing sound to pass through to a user. In this embodiment, housing front wall 20 may be contoured to ergonomically fit a typical human face (not shown), so as to increase user comfort and promote proper sound transfer from the mouthpiece 30 and from the earpiece 28.

A dial tone actuating component 36 extends through housing front wall 20 of housing 12 via dial tone actuating switch aperture 37, for manually actuating a dial tone of telephone 10. In the exemplary embodiment, dial tone actuating component 36 is an on/off pushbutton switch 56 known in the art, as shown in FIGS. 1-3. Push button switch 56 may require constant pressure applied by the telephone user to maintain electrical circuit continuity, or may be a toggle push button requiring a first depression to actuate and a second depression to disengage. In an alternative exemplary embodiment, dial tone actuating component 36 may be any on/off electrical switch capable of completing an electric circuit, including but not limited to a toggle lever switch, a relay, or a breaker switch. However, dial tone actuating component 36 should be limited in dimension to prevent injury to the user from being struck by dial tone actuating component 36 or its related structure, and for dial tone actuating component 36 to be ergonomically correct for proper usage. This ergonomic correctness includes proper positioning on housing front wall 20, proper throw distance of dial tone actuating component 36, and absence of surround structure, such as a switch-hook, that creates a hazard.

Dial tone actuating component 36 is electrically connected between phone line 58 (shown in FIGS. 3 and 4) and electronic circuit board 19. Phone line 58 accesses telephone 10 through housing 12 from a protected passage interior to the housing 12. In an exemplary embodiment, phone line 58 enters housing 12 through the wall mounting plate (not shown) behind or interior to the mounted housing 12, such that phone line 58 is not exposed to vandalism or environmental damage. Typically, phone line 58 is routed through a remote telephone routing switching equipment, for supervisory override control of telephone 10. Phone line 58 may be any form of communication transmission medium that may be protected by enclosing in a protective housing. Exemplary phone line 58 is a wire line.

Earpiece 28, mouthpiece 30 and push-button dialing pad 18 are also electrically and functionally connected to electronic circuit board 19. Electronic circuit board 19 includes electronic components known in the art of telephone and electrical switching to receive electrical signals from mouthpiece 30 and phone line 58, to transmit electrical signals to earpiece 28 and phone line 58, and to receive and process electrical input from push-button dialing pad 18 for transmission to phone line 58.

Referring primarily to FIG. 3, volume control assembly 60 can be electrically connected to earpiece 28 and mouthpiece 30 for increasing and decreasing sound coming out of earpiece 28 and sound going into mouthpiece 30. In an exemplary embodiment, volume control assembly 60 comprises on/off push-button switch 56, having built-in volume control circuit 62, with rotatable control knob 64.

In the exemplary embodiment, amplifier 66 is included, electrically connected between volume control circuit 62 and earpiece 28 and mouthpiece 30. Typically, amplifier 66 is a component of electronic circuit board 19. Typically, when control knob 64 is manually rotated in a clockwise direction, the sound coming out of earpiece 28 and the sound going into mouthpiece 30 will be increased. When control knob 64 is manually rotated in a counterclockwise direction, the sound coming out of earpiece 28 and the sound going into mouthpiece 30 will be decreased.

Referring to FIGS. 1 through 3, in the exemplary embodiment, telephone 10 is mounted on building wall 14 at a height such that earpiece 28 is approximately level with the ear of an average height adult user.

Telephone 10 is equipped with an escrow mechanism indicated generally at 75, which in the exemplary embodiment is of a style known in the art suitably designed to recognize the receipt of coin currency and enable operation of telephone 10 when the proper amount of currency has been introduced. Various payment receiving slots may be employed to facilitate the introduction of payment to telephone 10. In the exemplary embodiment, housing front wall 20 may be provided with coin receiving slot 72, which allows for introduction of coin currency into housing 12. Escrow mechanism 75 is located so that the currency is deposited into coin box 87. In the exemplary embodiment, escrow mechanism 75 is housed within vault 80, and coin box 87 is accessible from the back of telephone 10, from the opposite side of wall 14 from housing front wall 20. As is well known in the art, a coin return slot 70 is included in housing front wall 20 for return of coin currency when appropriate. Alternative methods of receiving currency may also be provided, such as optional credit card receiving slot 71 or paper currency receiver (not shown) without varying from the inventive subject matter. As known in the art, escrow mechanism 75 receives payment for calls and permits activation of electronic circuit board 19 as long as appropriate payment is maintained.

To use telephone 10, a user deposits sufficient funds and actuates dial tone actuating component 36. With dial tone actuating component 36 actuated, telephone 10 receives a dial tone and the user dials the desired phone number. The user then places his ear next to earpiece 28, or in an alternative embodiment next to the sound transparent section of housing front wall 20 in front of earpiece 28, to hear the person being called. The vertical orientation of mouthpiece 30 is such that mouthpiece 30 is ergonomically oriented below earpiece 28 for normal speech input into mouthpiece 30 when the user's ear is placed next to earpiece 28. In the exemplary embodiment, the volume for earpiece 28 and mouthpiece 30 is controlled by control knob 64 as described above. When the call is finished, the user disengages dial tone actuating component 36, such as by releasing on/off button 56 in one embodiment, again pushing on/off button 56 in another embodiment, or stroking a lever in yet another embodiment.

In an exemplary embodiment, telephone 10 is capable of dialing out to another phone, but is not enabled to receive incoming phone calls. An advantage of this embodiment is to control phone traffic and ensure safety by preventing potentially undesirable outside phone calls.

Figure 4:
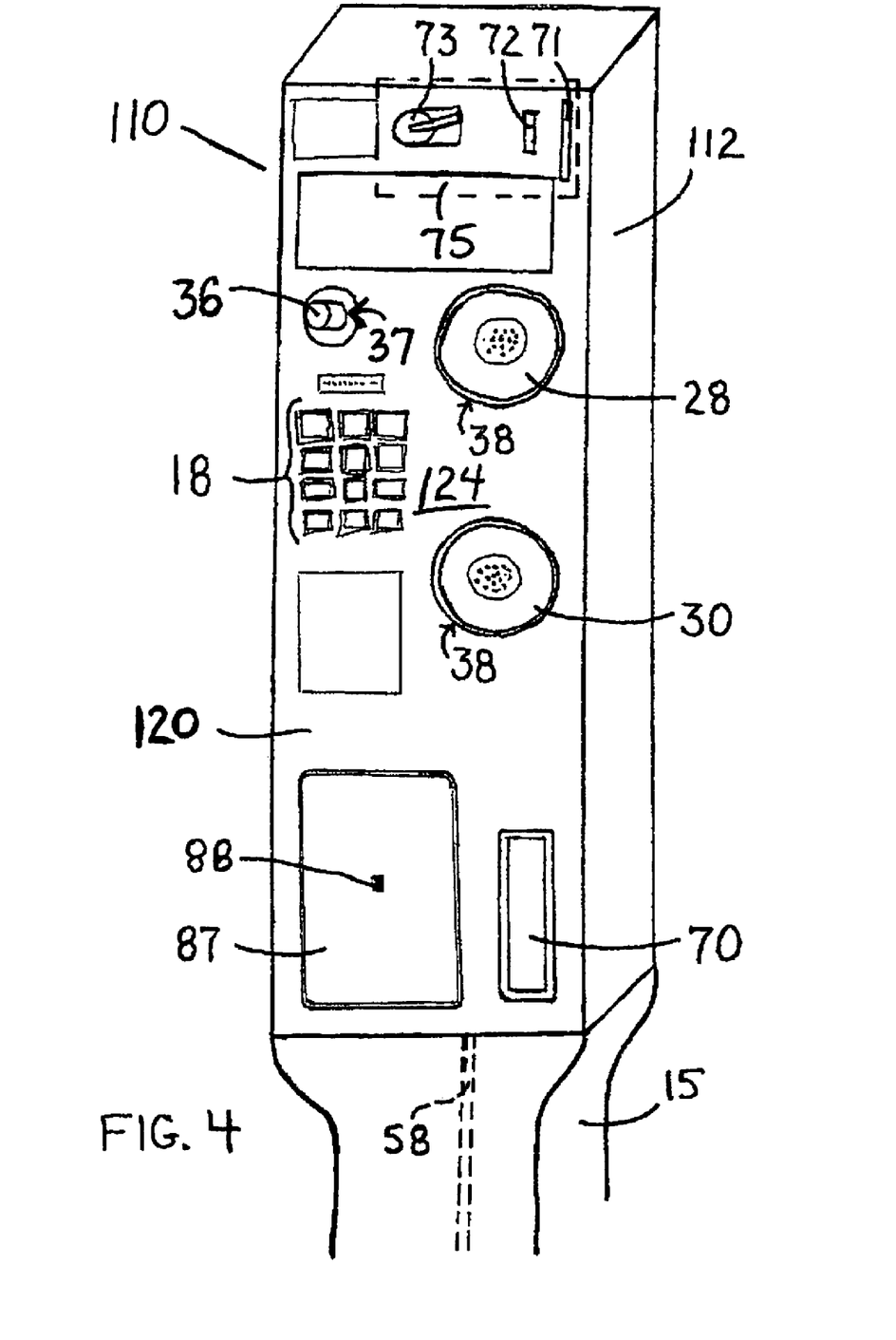
FIG. 4 is a perspective view of an alternate exemplary embodiment of the present invention on a freestanding mount.
Figure 5:
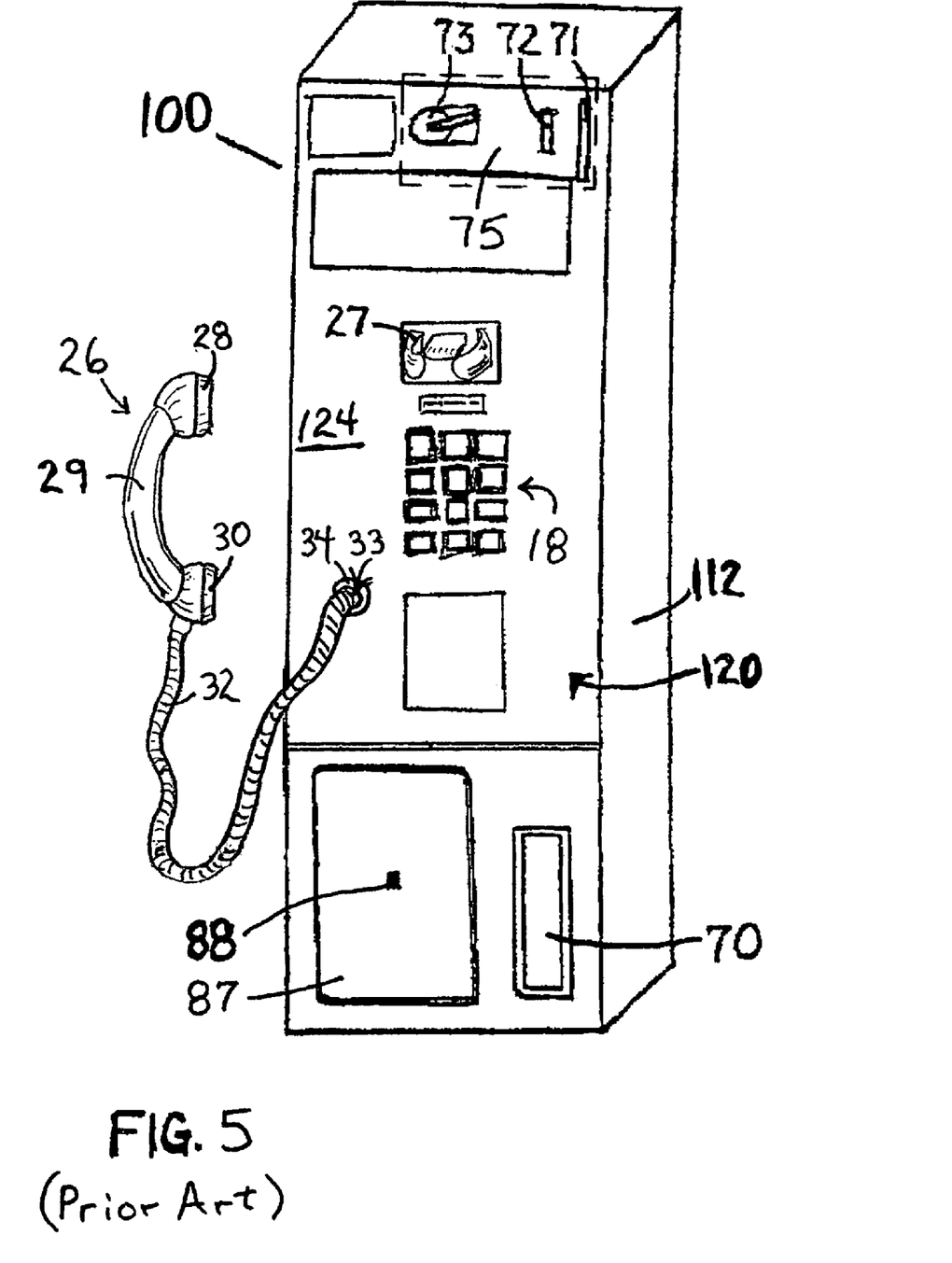
FIG. 5 is a perspective view of a conventional prior art payphone.

In an alternate exemplary embodiment illustrated in FIG. 4, wherein like reference numerals are generally analogous to those of FIGS. 1-3, a telephone 110 is constructed from a telephone housing 112, styled in a fashion known to the art. Housing front wall 120, analogous to the front wall 20 of the previous figures, is modified to accept dial tone actuating component 36. Aural apertures 38 are made in housing front wall 120. Typical switch hook lever (not shown) and handset hooks (not shown) are removed or never installed. In this fashion, housing 112 protects working mechanisms of telephone 110, in order to reduce telephone's 110 potential for debilitating abuse.

Telephone 110 may be mounted to a freestanding mount 15. Freestanding mount 15 provides secure support to telephone 110 and protection to phone line 58, which connects to telephone 10 through the interior of freestanding mount 115.

Telephone 110 illustrates that escrow system coin box 87 can be arranged to be accessed from the front of housing 112. Alternate embodiments of a telephone according to the invention permit alternate orientations of escrow system coin box 87. In an exemplary embodiment, coin box 87 of telephone 110 is located in the housing 112 in a manner known in the art, so as to be difficult to remove absent the key for a locking mechanism, such as locking mechanism 88.

Figure 6:
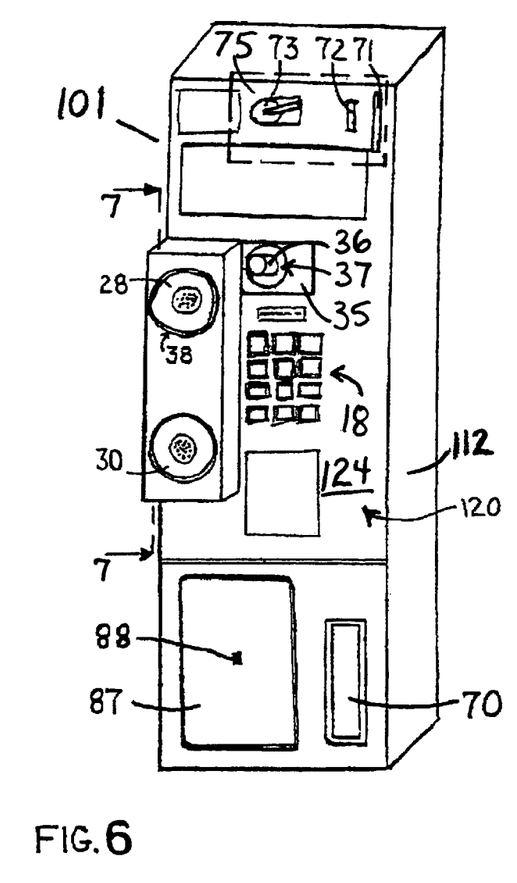
FIG. 6 is a perspective view of an existing payphone retrofit with a retrofit housing member according to the present invention.
Figure 7:
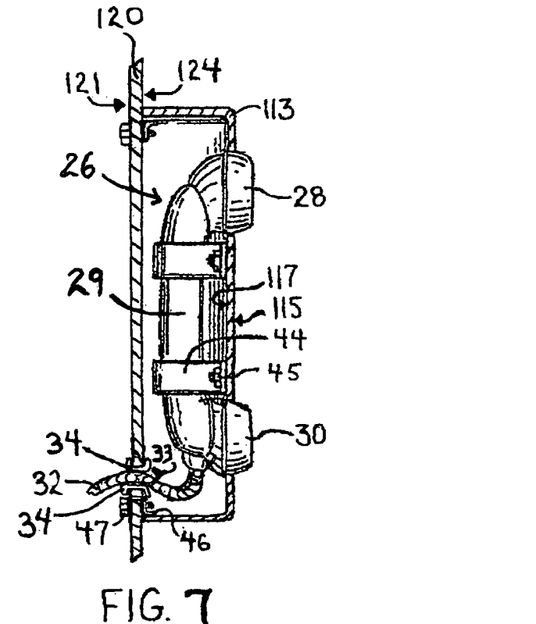
FIG. 7 is a cut-away side view of an exemplary embodiment of a retrofit housing member of FIG. 6, cut along line 7-7.
Figure 8:
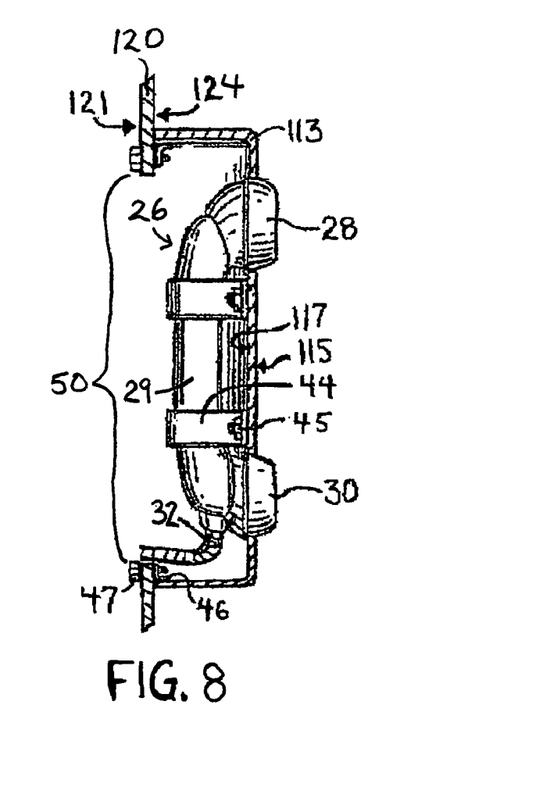
FIG. 8 is a cut-away side view of an alternate exemplary embodiment of a retrofit housing member of FIG. 6, cut along line 7-7.

Referrring to FIGS. 5 through 8, a particular advantage of the invention is that, in some embodiments, an existing conventional phone 100 may be retrofitted to make an abuse-resistant phone 101 as illustrated in FIG. 6. For example, housing 112 of an existing phone 100 may serve as and be referred to as a main housing member 112. Main housing member 112 includes a portion of each of inner surface 121, generally interior to main housing member 112, and outer surface 124, opposite interior surface 121. Retrofit housing member 113 is securable to main housing member 112 with a fastening member, such as hidden mounting brackets 46 and screws 47. Thus, retrofit housing member 113 is to be viewed as a part of housing 112 for this embodiment. Aural apertures 38 are included on retrofit housing member 113. Mouthpiece 30 and earpiece 28 are fixed with respect to the retrofit housing member 113 of housing 112, such that mouthpiece 30 and earpiece 28 may be selectively retrofitted and secured via retrofit housing member 113 to an existing phone 100, making retrofit safety phone 101.

The embodiment shown in FIG. 6 has a particular advantage in that existing telephones may be modified rather inexpensively, as compared with the cost of constructing a new phone. For example, conventional handset 26 may be used to supply the earpiece 28 and mouthpiece 30. Conventional handset 26 has a handle 29, with earpiece 28 and mouthpiece 30 spaced apart on and rigidly secured to handle 29. Handset 26 may be secured to retrofit housing member 113 by positioning at least one retention bracket 44 about handle 29 and fastening to retrofit housing member 113 with at least one retention fastener 45. In the exemplary embodiment a fixed treaded shaft extends outwardly from retrofit front wall inner surface 117 and a compatibly threaded nut is mountable thereon to secure retention bracket 44 holding handset 26.

Figure 9A:
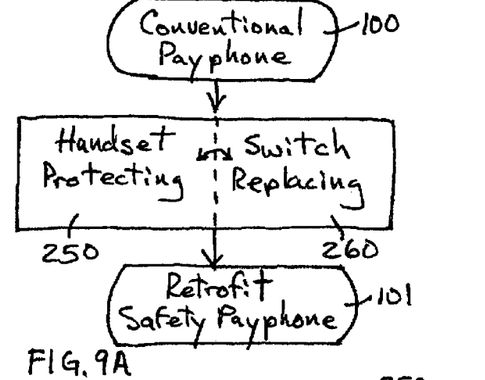
FIG. 9A is a flow diagram of a retrofitting method of the current invention.
Figure 9B:
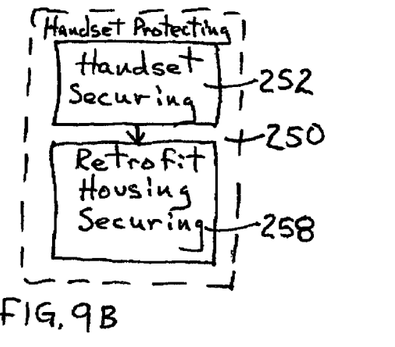
FIG. 9B is a flow diagram of a handset protecting step of the current invention.

Referring to FIGS. 5 through 8, a retrofit safety phone 101 of the current invention may be constructed by modifying a conventional phone 100. The procedural flow of such a method is generally depicted in FIG. 9A and consists of handset protecting 250 and switch replacing 260 that can occur in either sequence. Handset protecting 250, shown in more detail in FIG. 9B, comprises handset securing 252, which consists of securing handset 26 against the inner front wall 117 of retrofit housing member 113, and retrofit housing securing 254, which consists of securing retrofit housing member 113 to housing front wall 120, covering the entirety of connection wire 32 and connection wire aperture 33, such that all of connecting wire 32 and handset 26 extending from the front 120 of conventional phone 100 are contained within the space defined by retrofit housing member 113 and front wall outer surface 124.

Figure 9C:
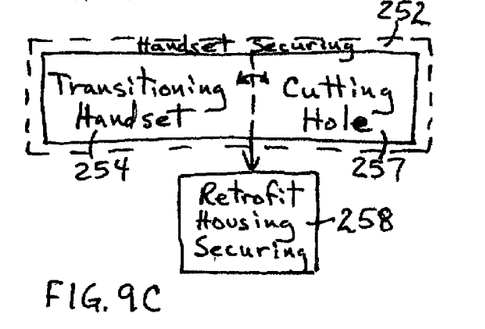
FIG. 9C is a flow diagram of an alternative handset protecting step of the current invention.
Figure 9D:
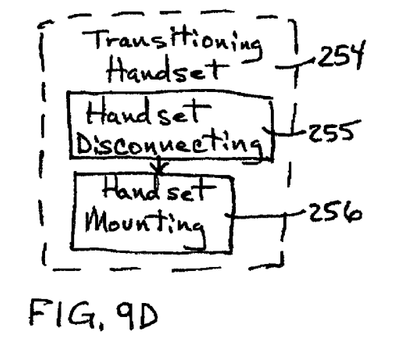
FIG. 9D is a flow diagram of a transitioning handset step of the current invention.

In an alternative embodiment depicted in FIG. 9C, handset securing 252 comprises transitioning handset 254 and cutting hole 257, which may in part occur in either order. As shown in FIG. 9D, transitioning handset 254 may comprise handset disconnecting 255 followed by handset mounting 256. Additionally referring to FIGS. 2, 5, and 8, cutting hole 257 may need to occur prior to completing handset mounting 256 in embodiments where handset 26 is accessed from the back of retrofit housing member 113 through opening 50. Cutting hole 257 creates opening 50 in front wall 120 large enough to permit handset 26 to pass through, but yet can be completely covered by retrofit housing member 113. Handset mounting 256 securely installs handset 26 into retrofit housing member 113, and secures retrofit housing member 113 to housing front wall 120, occluding the opening in front wall 120, and connecting connection wire 32 to electronic circuit board 19. Transitioning handset 254 includes disconnecting 255 handset 26 from electronic circuit board 19 in order to pull connection wire 32 from housing front wall 120. Mounting 256 handset 26 and connection wire 32 may then be accomplished from the back of phone 100 to electronic circuit board 19, running connection wire 32 and handset 26 through opening 50.

Figure 9E:
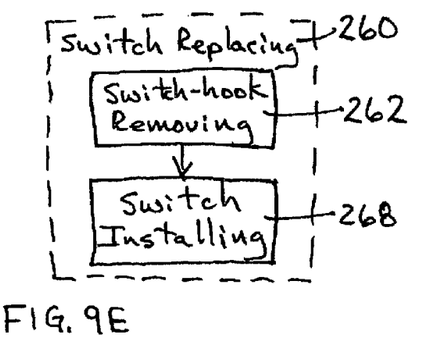
FIG. 9E is a flow diagram of a switch replacing step of the current invention.

Referring to FIGS. 9A and 9E, switch replacing 260 comprises switch-hook removing 262, wherein switch-hook assembly 27 of conventional phone 100 is removed from phone housing front wall 120, and switch installing 264, wherein dial tone actuator assembly 35 is sized and secured as a direct replacement to switch-hook assembly 27.

The foregoing disclosure and description of the invention is illustrative and explanatory thereof. It is understood that each of the elements described above, or two or more together may also find a useful application in other types of methods differing from the type described above. While certain novel features of this invention have been taught and pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. The present invention should only be limited by the following claims and their legal equivalents.

I claim:

1. An abuse-resistant phone for permanent mounting to a mounting surface in an environment wherein the phone is subject to abuse, said phone attachable to a phone line, said phone comprising:

a housing having a main housing member and a retrofit housing member;

said main housing member including at least one push button aperture, and a portion of an inner surface, a housing interior, and an outer surface;

said retrofit housing member securable to said main housing member and including another portion of each of said inner surface, said housing interior, and said outer surface, said retrofit housing member further including a pair of aural apertures;

a mouthpiece and an earpiece at least partially disposed within said housing interior, said mouthpiece and said earpiece fixed with respect to said retrofit housing member of said housing, such that said mouthpiece and said earpiece may be selectively retrofitted and secured via the retrofit housing member to an alternate main housing member;

a plurality of push buttons at least partially disposed within said housing interior and positioned with respect to said at least one push button aperture for functional access from outside said housing;

an escrow mechanism accessible from outside said housing for accepting payment, said escrow mechanism including payment receiving slot, each through said housing front wall and a coin box interior to said housing for receiving payment;

a dial tone actuating component accessible outside said housing for actuating a dial tone; and an electronic circuit board disposed within said housing interior and electronically connected to each of said earpiece, said mouthpiece, said plurality of push buttons, said escrow mechanism, and said dial tone actuating component.

2. An abuse resistant phone as defined in claim 1, further comprising:

a conventional handset including a handle, said earpiece and said mouthpiece spaced apart and rigidly secured to said handle, said handset secured to said retrofit housing member.

3. An abuse-resistant phone as defined in claim 1, further comprising:

at least one mounting bracket for securing said handset to said retrofit housing member, said at least one mounting bracket positioned about said handle and fastened to said retrofit housing member with at least one fastening member.

* * * * *